United States Patent
Breeden

(10) Patent No.: US 6,681,848 B2
(45) Date of Patent: Jan. 27, 2004

(54) METHOD AND APPARATUS FOR OPERATING A THERMOSTAT TO PROVIDE AN AUTOMATIC CHANGEOVER

(76) Inventor: Robert Louis Breeden, 218 W. Rio Ridge, Azle, TX (US) 76020

( * ) Notice: Subject to any disclaimer, the term of this patent is extended or adjusted under 35 U.S.C. 154(b) by 292 days.

(21) Appl. No.: 09/960,128

(22) Filed: Sep. 21, 2001

(65) Prior Publication Data

US 2003/0056946 A1 Mar. 27, 2003

(51) Int. Cl.[7] .................................................. F24F 11/00
(52) U.S. Cl. ..................................... 165/238; 165/254
(58) Field of Search ................................. 165/238, 265, 165/268; 236/46 R

(56) References Cited

U.S. PATENT DOCUMENTS

| 3,815,668 | A | * | 6/1974 | Carlson ........................ 165/256 |
| 4,316,256 | A | * | 2/1982 | Hendricks et al. ............ 700/278 |
| 4,386,649 | A | * | 6/1983 | Hines et al. .................. 165/239 |
| 4,446,913 | A |   | 5/1984 | Krocker |
| 4,632,177 | A |   | 12/1986 | Beckey |
| 4,799,176 | A | * | 1/1989 | Cacciatore ................... 700/278 |
| 4,836,442 | A |   | 6/1989 | Beckey |
| 5,937,942 | A | * | 8/1999 | Bias et al. ................... 165/238 |
| 6,102,749 | A | * | 8/2000 | Lynn et al. .................. 439/810 |

* cited by examiner

Primary Examiner—Terrell McKinnon
(74) Attorney, Agent, or Firm—Robert Louis Breeden

(57) ABSTRACT

A method and apparatus defines (302) a time period Ps following a completion of a demand for one of heating and cooling, the time period sufficient to allow a sensed room temperature Tr measured (309) by a thermostat (500) to stabilize after the completion of the demand; and records (310) an evaluation temperature Te equal to the sensed room temperature measured at an end of the time period. The method and apparatus determines (318, 320, 324, 326), at a future time after recording the evaluation temperature, whether to allow an automatic changeover between heating and cooling modes, based upon a comparison of the evaluation temperature and the sensed room temperature measured at the future time.

21 Claims, 3 Drawing Sheets

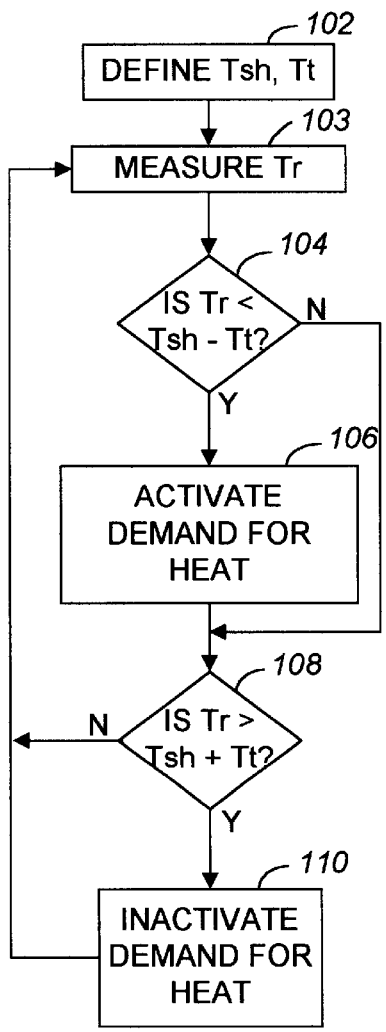
FIG. 1
PRIOR ART    100
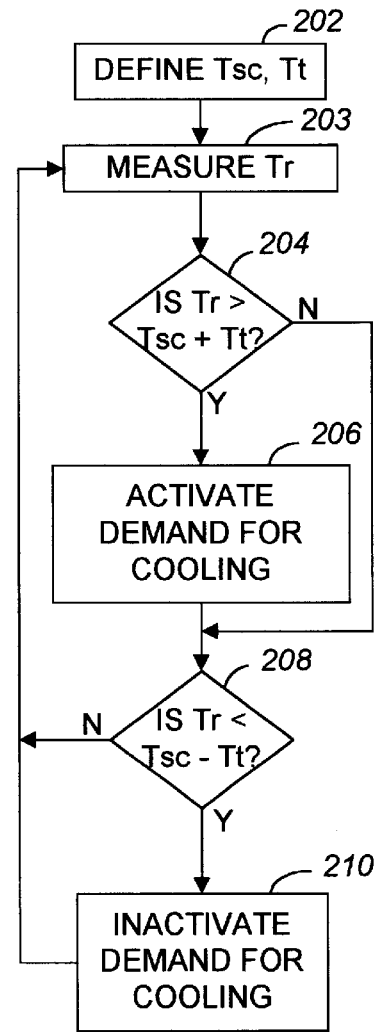
FIG. 2
PRIOR ART    200
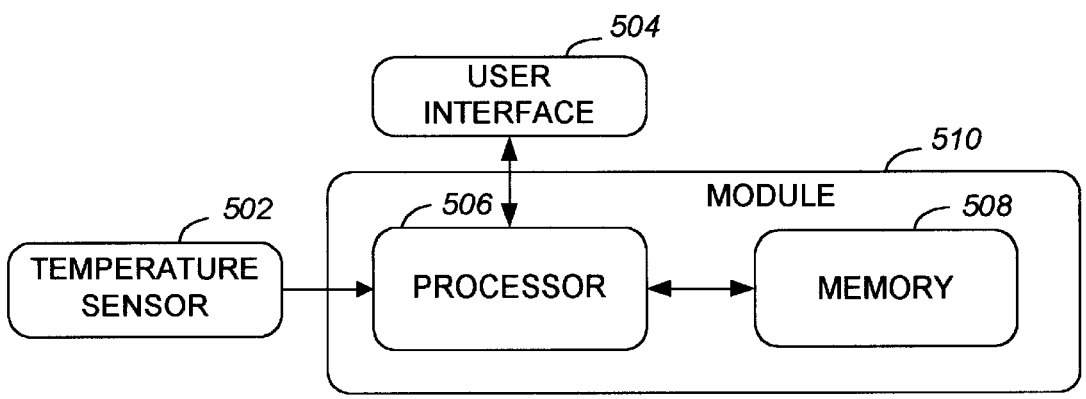
FIG. 5    500

300

400

US 6,681,848 B2

METHOD AND APPARATUS FOR OPERATING A THERMOSTAT TO PROVIDE AN AUTOMATIC CHANGEOVER

FIELD OF THE INVENTION

This invention relates in general to temperature controllers for heating and cooling systems, and more specifically to a method and apparatus for operating a thermostat to provide an automatic changeover between heating and cooling modes.

BACKGROUND OF THE INVENTION

Thermostats for use with a building heating and cooling system are well known. A typical prior-art thermostat provides a mode switch having at least two positions for allowing a user to changeover manually between a heating mode, in which the thermostat controls the heating system; and a cooling mode, in which the thermostat controls the cooling system. Such thermostats generally have used a single setpoint temperature. Unfortunately, these thermostats require frequent user attention to the mode switch during temperate seasons such as Spring and Fall, in which cooling may be desired during the day, and heating at night.

In an attempt to automate the changeover between heating and cooling, manufacturers of prior-art thermostats have constructed "automatic-changeover" thermostats, which have used first and second setpoint temperatures, respectively, for heating and cooling. In such prior-art thermostats, the first and second setpoint temperatures are not independent of each other, because, in effect, both are active simultaneously. The first setpoint temperature is required to be less than the second setpoint temperature by a predetermined number of degrees, e.g., 4–5 degrees F., to prevent excessive cycling of the thermostat between heating and cooling due to a demand for heating causing the sensed room temperature to move into the cooling operational range, and vice versa. Unfortunately, without manual intervention, this type of prior-art thermostat forces the average room temperature when using heat to be at least 4–5 degrees F. cooler than the average room temperature when using cooling, which some people find uncomfortable.

Thus, what is needed is an automatic changeover thermostat in which the first and second setpoint temperatures can be set independently of each other, without concern for excessive cycling between heating and cooling. Such a thermostat preferably will allow the use of a single setpoint temperature for both heating and cooling, if desired, without requiring manual user intervention to select between the heating and cooling modes.

BRIEF DESCRIPTION OF THE DRAWINGS

FIG. 1 is a flow chart depicting operation of a prior-art thermostat when in a heating mode.

FIG. 2 is a flow chart depicting operation of a prior-art thermostat when in a cooling mode.

FIG. 5 is an electrical block diagram of a thermostat in accordance with the present invention.

DETAILED DESCRIPTION OF THE DRAWINGS

Figure 3:
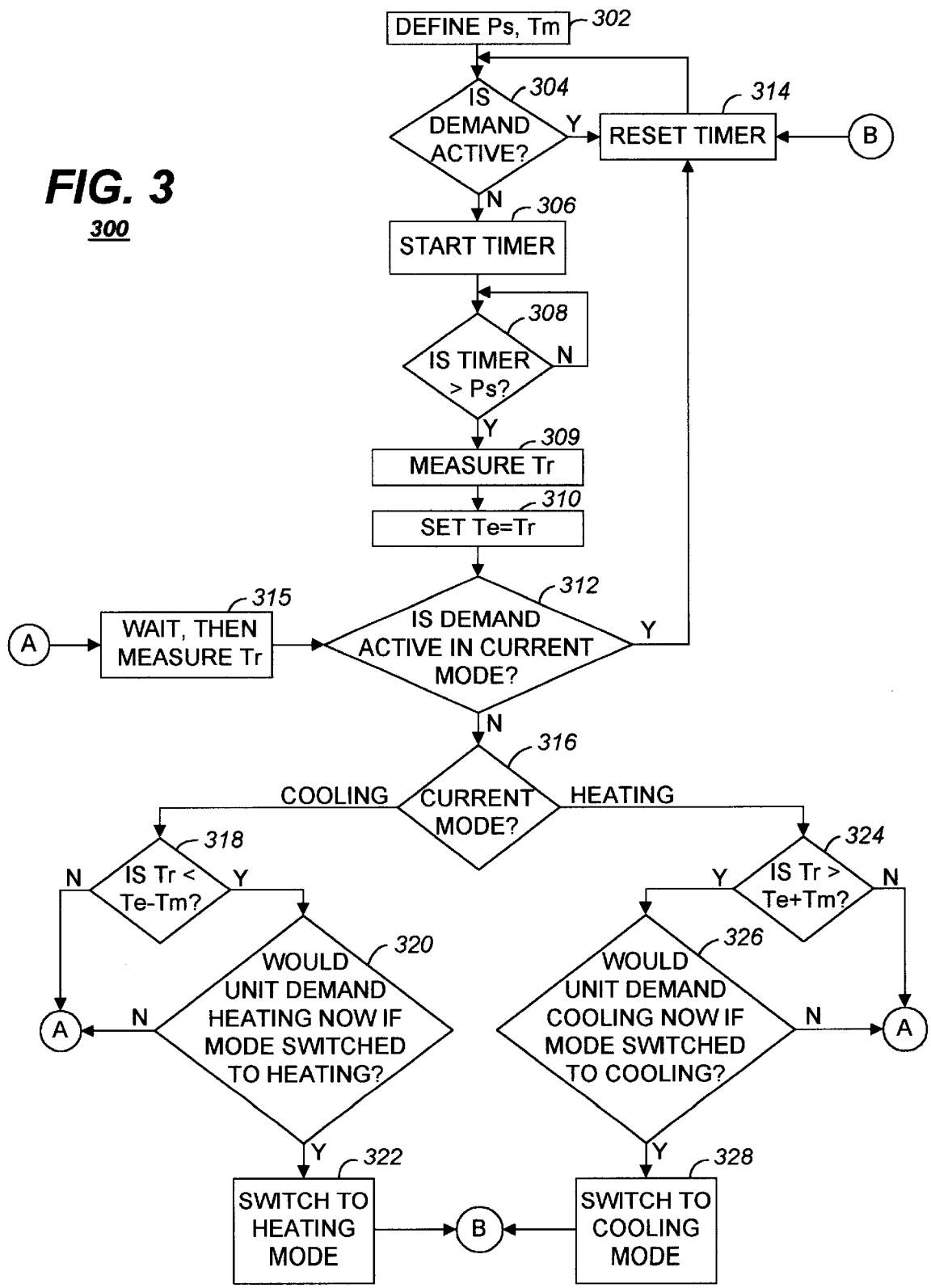
FIG. 3 is a flow chart depicting a technique for automatic changeover between heating and cooling modes in a thermostat in accordance with the present invention.

Referring to FIG. 1, a flow chart 100 depicts operation of a prior-art thermostat when in a heating mode. The flow begins with defining 102 a user-programmed setpoint temperature Tsh to be the target temperature when in the heating mode, and a temperature tolerance Tt (preferably pre-programmed by the manufacturer of the thermostat) within which the temperature is to be maintained, centered about the setpoint temperature Tsh. For example, if a user sets Tsh at 75, and Tt is pre-programmed at 0.5, the thermostat will attempt to maintain the sensed room temperature between 74.5 and 75.5 degrees F. Next, the room temperature Tr sensed by the thermostat is measured 103 and recorded. At step 104, a first comparison is made to determine whether Tr is less than Tsh minus Tt. If so, a demand for heat is activated 106, and the flow then moves to step 108. If not, step 106 is skipped, and the flow moves directly to step 108. At step 108, a second comparison is made to determine whether Tr is greater than Tsh plus Tt. If so, any existing demand for heat is inactivated 110, and the flow returns to step 103. If not, the flow returns directly to step 103.

Referring to FIG. 2, a flow chart 200 depicts operation of a prior-art thermostat when in a cooling mode. The flow begins with defining 202 a user-programmed setpoint temperature Tsc to be the target temperature when in the cooling mode, and a temperature tolerance Tt (preferably pre-programmed by the manufacturer of the thermostat) within which the temperature is to be maintained, centered about the setpoint temperature Tsc. For example, if a user sets Tsc at 76, and Tt is pre-programmed at 0.5, the thermostat will attempt to maintain the sensed room temperature between 75.5 and 76.5 degrees F. Next, the room temperature Tr sensed by the thermostat is measured 203 and recorded. At step 204, a first comparison is made to determine whether Tr is greater than Tsc plus Tt. If so, a demand for cooling is activated 206, and the flow then moves to step 208. If not, step 206 is skipped, and the flow moves directly to step 208. At step 208, a second comparison is made to determine whether Tr is less than Tsc minus Tt. If so, any existing demand for cooling is inactivated 210, and the flow returns to step 203. If not, the flow returns directly to step 203.

Activation and inactivation of a demand for heating or cooling by a thermostat in accordance with the present invention is substantially identical to that depicted in the flow charts 100 and 200, respectively, when in the heating mode or in the cooling mode. What is different is the method employed by the thermostat in accordance with the present invention for deciding whether and when to switch into the heating mode or into the cooling mode.

Referring to FIG. 3, a flow chart 300 depicts a technique for automatic changeover between heating and cooling modes in a thermostat in accordance with the present invention. In the flow chart 300, two predetermined parameters are used to accommodate for an overshoot of the sensed room temperature Tr, as measured by the thermostat sensor following a demand for heating or cooling. The overshoot is caused primarily by a thermal time constant of the sensor, and to a lesser degree by an operation of the heating or cooling system beyond the end of the demand, e.g., operating the air mover for a predetermined period after a demand for heat in order to recover heat remaining in the heating element. In effect, the overshoot causes Tr to continue to increase, although at a slowing rate, after the end of a demand for heat. Similarly, Tr will continue to decrease, although at a slowing rate, after the end of a demand for cooling. The overshoot has been a major problem in prior-art automatic changeover thermostats, forcing the heating and cooling setpoint temperatures apart to prevent excessive cycling, but is advantageously dealt with in accordance with the present invention as disclosed herein below.

The flow chart 300 begins with the definition 302 of the two predetermined parameters: a time period for temperature stabilization Ps, and a temperature margin Tm. The parameters are used to accommodate for the overshoot of the sensed room temperature Tr as measured by the thermostat sensor following a demand for heating or cooling. In general, Ps must be sufficiently long to allow the overshoot of Tr following a demand to settle to within less than Tm of its steady-state temperature, under the assumption that the actual room temperature remains constant while the heating and cooling system is inactive. Values for Ps and Tm that are deemed to work well for a forced-air heating and cooling system in a typical residential environment are Ps=30 minutes and Tm=0.5 degree F. It will be appreciated that the values of Ps and Tm can be adjusted over a reasonable range (e.g., 5<Ps<120 minutes, and 0.1<Tm<2 degrees F.) to better accommodate other types of systems and environments. In general, larger values of Ps and Tm reduce the probability of cycling between heating and cooling modes, while smaller values reduce the amount of temperature change before a mode changeover will occur. It will be further appreciated that the predetermined parameters Ps and Tm can be either factory-set or can be allowed to be programmed in the field by a user.

At step 304, a check is made to determine whether a demand for heating or cooling is currently active. If so, a stabilization timer is reset 314 and the flow returns to step 304 to continue testing whether the demand is still active. When, at step 304, the demand is no longer active, the stabilization timer is started 306. At step 308, a check is made to determine whether the timer value is greater than the period for temperature stabilization Ps. If not, the flow returns to step 308 to continue checking. When the timer value exceeds Ps, the flow then moves to step 309, to measure and record the sensed room temperature Tr. At step 310, an evaluation temperature Te is set equal to Tr. At step 312, a further check is made to determine whether a demand is active in the current heating or cooling mode. If so, the flow returns to step 314 to reset the stabilization timer and to wait until the demand ends. If not, the flow moves to step 316 to determine whether the current mode is the heating mode or the cooling mode.

If at step 316 the current mode is the cooling mode, the flow proceeds to step 318 to determine whether the currently sensed room temperature Tr is less than the evaluation temperature Te by more than the temperature margin Tm. If not, the flow moves to step 315 to wait for a predetermined time, e.g., 1 minute, and then to measure and record the currently sensed room temperature Tr. Flow then proceeds to step 312, as before. If, on the other hand, at step 318 Tr is less than Te−Tm, then the flow moves to step 320 to determine whether a switch to the heating mode would produce an immediate demand for heating. If not, the flow returns to step 315, as before. If, on the other hand, at step 320 a switch to the heating mode would produce an immediate demand for heating, the flow moves to step 322 to switch to the heating mode, after which the flow returns to step 314 to reset the timer and wait for the currently active demand to end.

If, on the other hand at step 316 the current mode is the heating mode, the flow proceeds to step 324 to determine whether the currently sensed room temperature Tr is greater than the evaluation temperature Te by more than the temperature margin Tm. If not, the flow moves to step 315 to wait for a predetermined time, e.g., 1 minute, and then to measure and record the currently sensed room temperature Tr. Flow then proceeds to step 312, as before. If, on the other hand, at step 324 Tr is greater than Te+Tm, then the flow moves to step 326 to determine whether a switch to the cooling mode would produce an immediate demand for cooling. If not, the flow returns to step 315, as before. If on the other hand, at step 326 a switch to the cooling mode would produce an immediate demand for cooling, the flow moves to step 328 to switch to the cooling mode, after which the flow returns to step 314 to reset the timer and wait for the currently active demand to end.

It will be appreciated that, for thermostats which use a single setpoint temperature as the target temperature for both the heating and cooling modes, and which further use the same value of temperature tolerance Tt in both the heating and cooling modes, steps 320 and 326 can be eliminated. This is true because, for such thermostats, steps 320 and 326, when entered, will always produce affirmative results. Steps 320 and 326 are useful primarily for thermostats using separate setpoint temperatures for the heating and cooling modes, and in which the user has chosen to adjust the heating setpoint temperature to be lower than the cooling setpoint temperature.

Operation of the thermostat in accordance with the present invention, as depicted by the flow chart 300, advantageously allows the thermostat to closely control the room temperature about any desired setpoint temperature in both the cooling mode and the heating mode. Only during a transition from a first mode to a second, alternate mode will the sensed room temperature fall outside (by an amount equal to Tm) the limits maintained while operating within the first mode. For example, when Tm is set equal to 0.5 degree F., and the sensed room temperature is maintained between 74.5 and 76 degrees F. (including an overshoot of 0.5 degree during the temperature stabilization period Ps) while in the heating mode, then a sensed temperature rise to 76.5 degrees F. will cause a switchover to the cooling mode. Continuing the example, by appropriately choosing the setpoint temperature for the cooling mode, the thermostat in accordance with the present invention can be made to also maintain the sensed room temperature between 74.5 and 76 degrees F. while in the cooling mode. Furthermore, the value of the setpoint temperature for the cooling mode is not restricted in any way by the value of the setpoint temperature for the heating mode. The user advantageously has complete freedom to use whatever setpoint values are desired for the two modes.

Figure 4:
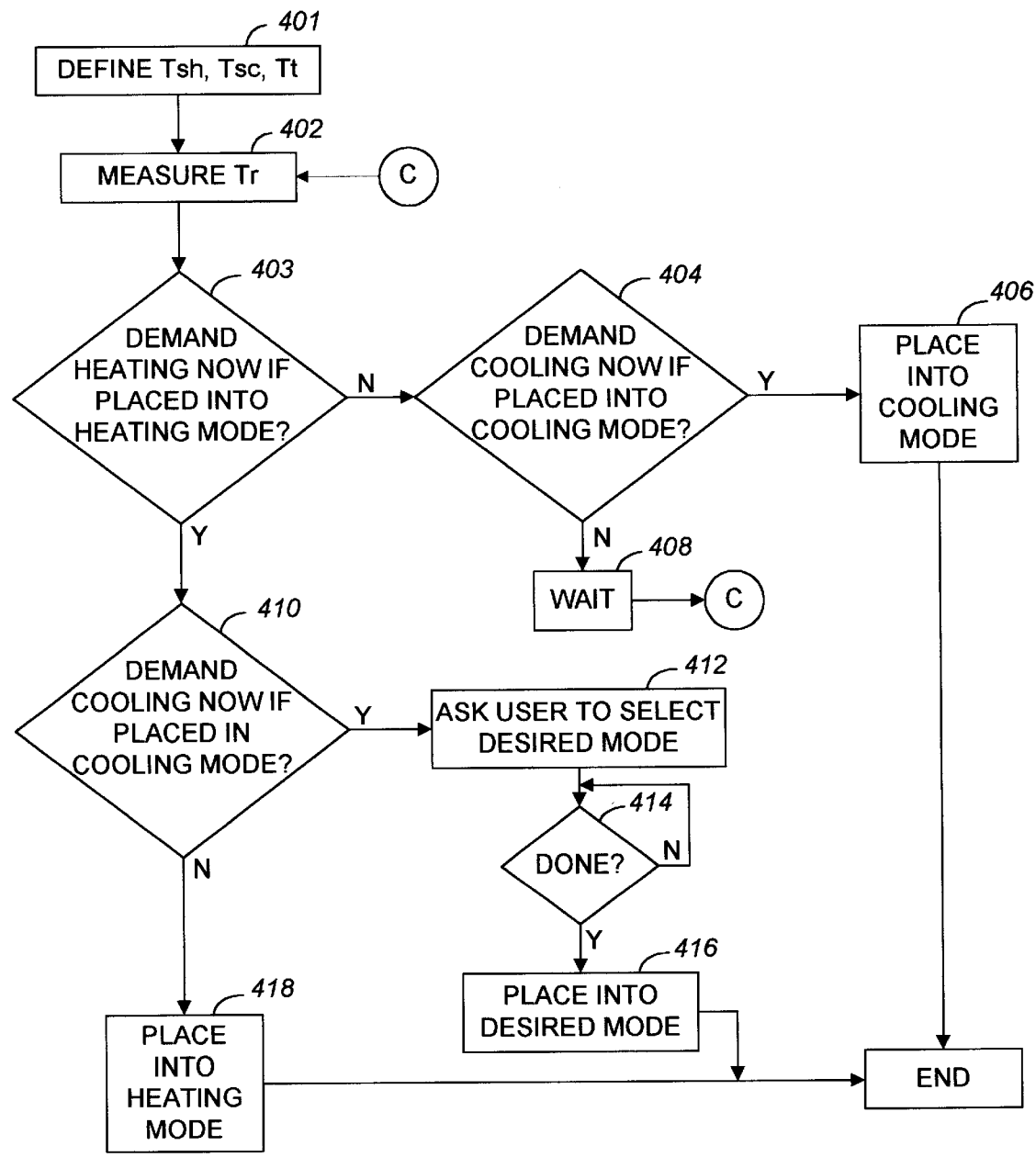
FIG. 4 is a flow chart depicting a start-up operation in a thermostat in accordance with the present invention.

Referring to FIG. 4, a flow chart 400 depicts a start-up operation in a thermostat in accordance with the present invention. A start-up operation is herein defined to mean a situation in which the mode of the thermostat is indefinite, e.g., immediately after an initial power-up, or immediately after the user has changed a setpoint temperature. The flow begins with defining 401 Tsh, Tsc, and Tt. (The heating and cooling setpoint temperatures Tsh and Tsc may have to be programmed by the user when this is an initial power-up. It will be appreciated that Tsh and Tsc can be assigned any values within the programming range of the thermostat, including the same identical values.)

Next, at step 402, the sensed room temperature Tr is measured. At step 403, a check is made to determine whether a demand for heating would occur immediately if the thermostat were to be placed into the heating mode. (This is essentially the same test performed in step 104 of the flow chart 100.) If so, at step 410, a check is made to determine whether a demand for cooling would also occur immediately if the thermostat were to be placed into the cooling mode. (This is essentially the same test performed in step 204 of the flow chart 200.) If so, the thermostat prompts 412 the user to select the desired mode. At step 414 the thermostat waits for the user's selection, after which the flow moves to step 416 to place the thermostat into the selected mode, after which the process ends. If, on the other hand, at step 410, a demand for cooling would not occur immediately if the thermostat were to be placed into the cooling mode, then the thermostat is placed 418 into the heating mode, and the process ends.

If, on the other hand, at step 403 a demand for heating would not occur immediately if the thermostat were to be placed into the heating mode, then, at step 404, a check is made to determine whether a demand for cooling would occur immediately if the thermostat were to be placed into the cooling mode. If so, the thermostat is placed 406 into the cooling mode, and the process ends. If not, after waiting for a predetermined time, e.g., 1 minute, the flow returns to step 402 to again measure the sensed room temperature Tr.

Referring to FIG. 5, an electrical block diagram 500 of a thermostat in accordance with the present invention comprises a temperature sensor 502, e.g., a conventional thermistor for sensing a room temperature, and a user interface 504, e.g., a conventional liquid crystal display and keypad for interfacing with a user. The temperature sensor 502 and the user interface 504 are coupled to a conventional processor 506 for controlling the thermostat in accordance with the present invention. The processor 506 is also coupled to a conventional memory 508, e.g., RAM, ROM, Flash, for programming the processor 506 in accordance with the present invention, and for storing operating variables and constants. It will be appreciated that the processor 506 and the memory 508 can be manufactured in combination as a module 510 for use in a thermostat in accordance with the present invention. It will be appreciated that additional conventional elements (not shown), such as a battery or an external power source can be utilized to provide operating power for the thermostat.

It should be clear from the preceding disclosure that the present invention provides an automatic changeover thermostat in which the first and second setpoint temperatures advantageously can be set independently of each other, without concern for excessive cycling between heating and cooling. Such a thermostat beneficially allows the use of a single setpoint temperature for both heating and cooling, if desired, without requiring manual user intervention to select between the heating and cooling modes.

Many modifications and variations of the present invention are possible in light of the above teachings. Thus, it is to be understood that, within the scope of the appended claims, the invention can be practiced other than as described herein above.

What is claimed is:

1. A thermostat for providing an automatic changeover from a current mode to a new mode, the current mode and the new mode being alternate ones of a heating mode for controlling a heating system and a cooling mode for controlling a cooling system, the thermostat comprising:
   a sensor for measuring a sensed room temperature;
   a processor coupled to the sensor for controlling the thermostat to operate continuously in one of the heating mode and the cooling mode, the processor programmed to define a time period following a completion of a demand for one of heating and cooling, said time period sufficient to allow the sensed room temperature measured by the sensor to stabilize after the completion of the demand; and
   a memory coupled to the processor for cooperating with the processor to record an evaluation temperature equal to the sensed room temperature measured at an end of said time period,
   wherein the processor is further programmed to make a determination, at a future time after recording the evaluation temperature, of whether to allow the automatic changeover, based upon a comparison of said evaluation temperature and the sensed room temperature measured at said future time.

2. The thermostat of claim 1, wherein the processor is further programmed to
   repeat making the determination of whether to allow the automatic changeover, based upon the comparison of said evaluation temperature and the sensed worn temperature measured at said future time, until an occurrence of one of the automatic changeover and a next demand in the current mode.

3. The thermostat of claim 1, further comprising
   a user interface coupled to the processor for allowing a user to control the thermostat,
   wherein the processor is further programmed to cooperate with the user interface to:
   define a single setpoint temperature; and
   utilize the single setpoint temperature as a target temperature for both the heating mode and the cooling mode.

4. The thermostat of claim 1, wherein the processor is further programmed, when the thermostat is in the heating mode, to
   switch to the cooling mode in response to the sensed room temperature becoming greater than the evaluation temperature by more than a predetermined margin.

5. The thermostat of claim 1, wherein the processor is further programmed, when the thermostat is in the cooling mode, to
   switch to the heating mode in response to the sensed room temperature becoming less than the evaluation temperature by more than a predetermined margin.

6. The thermostat of claim 1, further comprising
   a user interface coupled to the processor for allowing a user to control the thermostat,
   wherein the processor is further programmed to cooperate with the user interface to:
   define first and second setpoint temperatures having values which are not restricted by each other;
   utilize the first setpoint temperature as a target temperature for the beating mode; and
   utilize the second setpoint temperature as the target temperature for the cooling mode.

7. The thermostat of claim 1, wherein the processor is further programmed to:
   detect whether the automatic changeover to the new mode, when made, will cause an immediate demand for one of heating and cooling in the new mode; and
   delay the automatic changeover until the automatic changeover will cause the immediate demand in the new mode.

8. A module for use in a thermostat including a sensor for measuring a sensed room temperature, the module for cooperating with the sensor to provide an automatic changeover from a current mode to a new mode, the current mode and the new mode being alternate ones of a heating mode for controlling a heating system and a cooling mode for controlling a cooling system, the module comprising:
   a processor for controlling the thermostat to operate continuously in one of the heating mode and the cooling mode, the processor programmed to define a time period following a completion of a demand for one of heating and cooling, said time period sufficient to allow the sensed room temperature measured by the sensor to stabilize after the completion of the demand; and a memory coupled to the processor for cooperating with the processor to record an evaluation temperature equal to the sensed room temperature measured at an end of said time period, wherein the processor is further programmed to make a determination, at a future time after recording the evaluation temperature, of whether to allow the automatic changeover, based upon a comparison of said evaluation temperature and the sensed room temperature measured at said future time.

9. The module of claim 8, wherein the processor is further programmed to repeat making the determination of whether to allow the automatic changeover, based upon the comparison of said evaluation temperature and the sensed room temperature measured at said future time, until an occurrence of one of the automatic changeover and a next demand in the current mode.

10. The module of claim 8, wherein the thermostat further includes a user interface coupled to the processor for allowing a user to control the thermostat, and wherein the processor is further programmed to cooperate with the user interface to:

define a single setpoint temperature; and utilize the single setpoint temperature as a target temperature for both the heating mode and the cooling mode.

11. The module of claim 8, wherein the processor is further programmed, when the thermostat is in the heating mode, to switch to the cooling mode in response to the sensed room temperature becoming greater than the evaluation temperature by more than a predetermined margin.

12. The module of claim 8, wherein the processor is further programmed, when the thermostat is in the cooling mode, to switch to the heating mode in response to the sensed room temperature becoming less than the evaluation temperature by more than a predetermined margin.

13. The module of claim 8, wherein the thermostat further includes a user interface coupled to the processor for allowing a user to control the thermostat, and wherein the processor is further programmed to cooperate with the user interface to:

define first and second setpoint temperatures having values which are not restricted by each other;

utilize the first setpoint temperature as a target temperature for the heating mode; and utilize the second setpoint temperature as the target temperature for the cooling mode.

14. The module of claim 8, wherein the processor is further programmed to:

detect whether the automatic changeover to the new mode, when made, will cause an immediate demand for one of heating and cooling in the new mode; and delay the automatic changeover until the automatic changeover will cause the immediate demand in the new mode.

15. A method of operating a thermostat to provide an automatic changeover from a current mode to a new mode, the current mode and the new mode being alternate ones of a heating mode for controlling a heating system and a cooling mode for controlling a cooling system, the method comprising the steps of:

operating continuously in one of the heating mode and the cooling mode;

defining a time period following a completion of a demand for one of heating and cooling, said time period sufficient to allow a sensed room temperature measured by the thermostat to stabilize after the completion of the demand;

recording an evaluation temperature equal to the sensed room temperature measured at an end of said time period; and determining, at a future time after the recording step, whether to allow the automatic changeover, based upon a comparison of said evaluation temperature and the sensed room temperature measured at said future time.

16. The method of claim 15, further comprising the step of repeating the determining step until an occurrence of one of the automatic changeover and a next demand in the current mode.

17. The method of claim 15, further comprising the steps of:

defining a single setpoint temperature; and utilizing the single setpoint temperature as a target temperature for both the heating mode and the cooling mode.

18. The method of claim 15, wherein, when the thermostat is in the heating mode, the determining step comprises the step of switching to the cooling mode in response to the sensed room temperature becoming greater than the evaluation temperature by more than a predetermined margin.

19. The method of claim 15, wherein, when the thermostat is in the cooling mode, the determining step comprises the step of switching to the heating mode in response to the sensed room temperature becoming less than the evaluation temperature by more than a predetermined margin.

20. The method of claim 15, further comprising the steps of:

defining first and second setpoint temperatures having values which are not restricted by each other;

utilizing the first setpoint temperature as a target temperature for the heating mode; and utilizing the second setpoint temperature as the target temperature for the cooling mode.

21. The method of claim 15, wherein the determining step comprises the steps of:

detecting whether the automatic changeover to the new mode, when made, will cause an immediate demand for one of heating and cooling in the new mode; and delaying the automatic changeover until the automatic changeover will cause the immediate demand in the new mode.

\* \* \* \* \*